(12) United States Patent
Yamamoto

(10) Patent No.: US 7,648,788 B2
(45) Date of Patent: Jan. 19, 2010

(54) MEMBRANE-ELECTRODE ASSEMBLY FOR FUEL CELL AND FUEL CELL USING SAME

(75) Inventor: Shinji Yamamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 630 days.

(21) Appl. No.: 11/587,797

(22) PCT Filed: Apr. 22, 2005

(86) PCT No.: PCT/JP2005/007707

§ 371 (c)(1),
(2), (4) Date: Oct. 27, 2006

(87) PCT Pub. No.: WO2005/106994

PCT Pub. Date: Nov. 10, 2005

(65) Prior Publication Data

US 2008/0063915 A1    Mar. 13, 2008

(30) Foreign Application Priority Data

Apr. 28, 2004  (JP) ............... 2004-134401
Feb. 21, 2005  (JP) ............... 2005-044451

(51) Int. Cl.
*H01M 8/10* (2006.01)

(52) U.S. Cl. ............... 429/30; 977/734; 977/742

(58) Field of Classification Search ............... None
See application file for complete search history.

(56) References Cited

U.S. PATENT DOCUMENTS

| | | | |
|---|---|---|---|
| 5,316,990 A | 5/1994 | Cooper et al. | |
| 6,780,388 B2 | 8/2004 | Masuko et al. | |
| 2002/0064699 A1 | 5/2002 | Fukuda et al. | |
| 2003/0078157 A1 | 4/2003 | Matsuoka et al. | |
| 2008/0020263 A1* | 1/2008 | Satoh et al. | 429/40 |
| 2008/0199758 A1* | 8/2008 | Shin et al. | 429/34 |
| 2009/0029216 A1* | 1/2009 | Yamamoto | 429/30 |

FOREIGN PATENT DOCUMENTS

| | | |
|---|---|---|
| EP | 1 288 161 A1 | 3/2003 |
| JP | 5-129023 A | 5/1993 |
| JP | 2001-15138 A | 1/2001 |
| JP | 2002-050372 A | 2/2002 |
| JP | 2002-324564 A | 11/2002 |
| JP | 2004-079457 A | 3/2004 |
| JP | 2005-026174 A | 1/2005 |
| JP | 2005-129457 A | 5/2005 |
| JP | 2008176990 A * | 7/2008 |
| WO | WO 01/92151 A1 | 12/2001 |

* cited by examiner

*Primary Examiner*—Robert Hodge
(74) *Attorney, Agent, or Firm*—Foley & Lardner LLP

(57) ABSTRACT

The present invention provides a membrane-electrode assembly for a fuel cell, having improved durability for repeated start-stop operation. The present invention provides;

A membrane-electrode assembly for a fuel cell having:

a cathode catalyst layer containing a cathode catalyst comprising platinum or a platinum alloy, conductive carbon material supporting said cathode catalyst, and a proton conductive polymer electrolyte; a solid polymer electrolyte membrane; and an anode catalyst layer containing an anode catalyst, conductive carbon material supporting said anode catalyst, and a proton conductive polymer electrolyte;

wherein average thickness (Ya) of said anode catalyst layer is smaller than average thickness (Yc) of said cathode catalyst layer.

26 Claims, No Drawings

MEMBRANE-ELECTRODE ASSEMBLY FOR FUEL CELL AND FUEL CELL USING SAME

TECHNICAL FIELD

The present invention relates to a membrane-electrode assembly for a fuel cell, in particular relates to an electrode catalyst layer of a membrane-electrode assembly for a fuel cell.

BACKGROUND

Recently, in response to social needs or movement with the background of energy and environmental issues, a fuel cell has been noticed as a vehicle drive source and a stationary power source. A fuel cell is classified into various types based on electrolyte types or electrode types, which are represented by an alkali type, a phosphoric acid type, a fused carbonate salt type, a solid electrolyte type and a solid polymer type. Among these, because of operability at low temperature (usually not higher than 100° C.), a proton-exchange membrane fuel cell (PEFC) has been noticed and development and practical applications thereof have recently been progressing as a source of power for a low pollution type automobile (JP-A-2004-79457).

Composition of PEFC, generally, has such structure that a membrane-electrode assembly (MEA) is sandwiched by separators. Generally, MEA has structure laminated with a gas diffusion layer, a cathode catalyst layer, a solid polymer electrolyte membrane, an anode catalyst layer and a gas diffusion layer.

In MEA, the following electrochemical reaction proceeds. First, hydrogen contained in fuel gas supplied to an anode (fuel electrode) side is converted to protons and electrons by oxidation with a catalyst. Then, resultant protons pass through a polymer electrolyte contained in the anode side catalyst layer, and further through a solid polymer electrolyte membrane contacting with the anode side catalyst layer, and reach the cathode (air electrode) side catalyst layer. In addition, electrons generated at the anode side catalyst layer pass through a conductive carrier composing the anode side catalyst layer, and further the gas diffusion layer contacting with the anode side catalyst layer at a different side of the solid polymer electrolyte membrane, the gas separator and an external circuit, and reach the cathode side catalyst layer. Then, protons and electrons reached the cathode side catalyst layer react with oxygen contained in oxidizing agent gas supplied to the cathode side catalyst layer, and generate water. In a fuel cell, electricity can be taken out through the aforementioned electrochemical reaction.

As applications of PEFC, a vehicle drive source or a stationary power source has been studied. To be suitable to such applications, durability for a long period is required. In particular, use as a vehicle drive source requires no lowering of cell characteristics caused by frequent start-stop operation.

In particular, in an electrode catalyst layer containing a catalyst comprising platinum or a platinum alloy, conductive carbon material supporting a catalyst, and a proton conductive polymer electrolyte, repeated start-stop operation easily generates corrosion of the conductive carbon material or degradation of the polymer electrolyte by decomposition, and tends to reduce gas diffusion property and drainage property of the electrode, increase concentration over-voltage and lower cell characteristics.

Therefore, many attempts have been taken to improve corrosion resistance of conductive carbon material in the past. For example, JP-A-05-129023 and JP-A-2005-26174 have disclosed conductive carbon material having improved corrosion resistance by controlling crystallinity of carbon by means of heat treatment.

DISCLOSURE OF THE INVENTION

PEFC is required to show, as described above, high power generation performance over a long period. However, there have been some possibilities that a conventional membrane-electrode assembly can not provide sufficient power generation performance, even by conductive carbon material having improved corrosion resistance by heat treatment, as described in JP-A-05-129023 and JP-A-2005-26174, and the like.

One of the causes to lower power generation performance of a membrane-electrode assembly by repeated start-stop operation is considered to be residual hydrogen at an anode side in stopping. Hydrogen is supplied to an anode side as fuel, and when operation of a membrane-electrode assembly is stopped, residual hydrogen at an anode side is purged by supplying gas such as air to an anode side. However, when hydrogen is not completely purged and certain amount of hydrogen is left at an anode side, a local cell is formed at an anode side in starting operation, which makes a cathode side exposed in high voltage state. Consequently, oxygen is generated by electrolysis of water at platinum supported as a catalyst, resulting in oxidative corrosion of carbon material by a reaction of $C+O_2 \rightarrow CO_2$. Corrosion of carbon material results in deformation and deterioration of an electrode catalyst layer at a membrane-electrode assembly, increase in concentration over-voltage, and serious performance deterioration of PEFC. In addition, in a membrane-electrode assembly, elution of platinum to a solid polymer electrolyte membrane or decomposition of a polymer electrolyte is also induced by repeated start-stop operation in a membrane-electrode assembly, which also becomes a cause of performance deterioration of PEFC.

Therefore, an object of the present invention is to improve durability of a membrane-electrode assembly for a fuel cell for start-stop operation.

The present inventor has intensively studied, in view of the problems, and has clarified that durability of a cathode catalyst layer for repeated start-stop operation of a membrane-electrode assembly for a fuel cell can be enhanced by making an anode catalyst layer thinner relative to a cathode catalyst layer.

Namely, the problems can be solved by the following (1) to (3).

(1) A membrane-electrode assembly for a fuel cell having:

a cathode catalyst layer containing a cathode catalyst comprising platinum or a platinum alloy, a conductive carbon material supporting said cathode catalyst, and a proton conductive polymer electrolyte; a solid polymer electrolyte membrane; and an anode catalyst layer containing an anode catalyst, a conductive carbon material supporting said anode catalyst, and a proton conductive polymer electrolyte;

wherein average thickness of said anode catalyst layer (Ya) is smaller than average thickness of said cathode catalyst layer (Yc).

(2) A proton-exchange membrane fuel cell using the membrane-electrode assembly for a fuel cell set forth in (1).

(3) A vehicle mounted with the proton-exchange membrane fuel cell set forth in (2).

BEST EMBODIMENT FOR CARRYING OUT THE INVENTION

Embodiments of the present invention are explained in detail below.

The first aspect of the present invention is:

A membrane-electrode assembly for a fuel cell having:

a cathode catalyst layer containing a cathode catalyst comprising platinum or a platinum alloy, conductive carbon material supporting the cathode catalyst, and a proton conductive polymer electrolyte; a solid polymer electrolyte membrane; and an anode catalyst layer containing an anode catalyst, conductive carbon material supporting the anode catalyst, and a proton conductive polymer electrolyte;

wherein average thickness of the anode catalyst layer (Ya) is smaller than average thickness of the cathode catalyst layer (Yc).

In the membrane-electrode assembly for a fuel cell of the present invention, average thickness of the anode catalyst layer (Ya) is designed to be smaller than average thickness of the cathode catalyst layer (Yc). By this design, hydrogen remaining at the anode side in stopping operation is efficiently purged with other gas. As a result, formation of a local cell at the anode side in starting operation is suppressed, and deterioration of the membrane-electrode assembly is prevented.

In addition, when the anode catalyst layer is thin, water content of the anode catalyst layer tends to be lowered in purging with gas such as air for replacing hydrogen at the anode side in stopping operation. Namely, the anode catalyst layer tends to be dried easily. Consequently, as compensation of water content lowered at the anode catalyst layer, water migration occurs from the solid polymer electrolyte membrane having relatively high water content. At the same time, water migration occurs from the cathode catalyst layer to the solid polymer electrolyte membrane, which decreases water content of the cathode catalyst layer. Oxygen does not generate if water is not present at the vicinity of a platinum catalyst, even when the cathode catalyst layer is exposed to high voltage in starting operation. Therefore, carbon corrosion in start-stop operation can be suppressed.

However, the mechanism on composition and the effect of the present invention is only estimation, and technical scope of the present invention should not be limited to embodiments utilizing the mechanism.

As described above, in the membrane-electrode assembly of the present invention, average thickness of the anode catalyst layer (Ya) is designed to be smaller than average thickness of the cathode catalyst layer (Yc). Specifically, Ya and Yc preferably satisfy the relation of Ya/Yc=0.01 to 0.9, more preferably Ya/Yc=0.03 to 0.86. By controlling thickness of the catalyst layer to satisfy these relations, the membrane-electrode assembly having excellent durability can be obtained.

Average thickness of the anode catalyst layer (Ya) is preferably 0.3 to 10 μm, more preferably 0.3 to 8 μm, and particularly preferably 2 to 6 μm. In addition, average thickness of the cathode catalyst layer (Yc) is preferably 7 to 20 μm, and more preferably 7 to 15 μm. By adopting these ranges, carbon corrosion or platinum elution in start-stop operation or in load variation can effectively be suppressed. A thinner catalyst layer provides more excellent gas diffusion property and permeability, along with drainage of humidification water and generated water, however, a tooth in catalyst layer makes durability retention difficult, therefore, preferable thickness may be determined by taking balance thereof.

In this connection, in the present invention, thickness of each catalyst layer at the anode and the cathode is obtained by measuring thickness of the catalyst layer at 20 to 50 points, in an electron micrograph (magnification: 3000 times) of the cross-section of the catalyst layer taken under condition of a acceleration voltage of 3 kV, using a scanning electron microscope, and averaged value thereof is used.

Then, composition material of PEFC of the present invention is explained.

The cathode catalyst layer contains a catalyst comprising platinum or a platinum alloy, conductive carbon material supporting the cathode catalyst, and a proton conductive polymer electrolyte. In the cathode catalyst layer, the cathode catalyst preferably is supported on the conductive carbon material, and used as the cathode electrode catalyst.

The cathode catalyst is material for fulfilling a role to promote a reaction at the cathode side (air electrode) of the membrane-electrode assembly, and at least platinum or a platinum alloy is used. As the platinum alloy, although not especially limited, an alloy between platinum and iridium or an alloy between platinum and rhodium preferably is included due to providing high catalytic activity. In addition to the above, as the platinum alloy, an alloy between at least one kind of base metal selected from chromium, manganese, iron, cobalt and nickel, and platinum preferably is included, aiming at improvement of heat resistance, poisoning resistance against carbon monoxide, and the like. Mixing ratio of the platinum and the base metal in the platinum alloy preferably is 1/1 to 5/1 in mass ratio (platinum/base metal), in particular, 2/1 to 4/1. By adopting the ratio, a cathode catalyst having poisoning resistance, corrosion resistance, and the like while maintaining high catalytic activity can be obtained.

Average particle diameter of the cathode catalyst is not especially limited, and is preferably 1 to 20 nm, and more preferably 2 to 10 nm. Catalyst particles are predicted to have also more improved catalytic activity with smaller average particle diameter due to having increased specific surface area, however, in practice, catalytic activity comparable to increment in specific surface area tends not to be obtained, even if catalyst particle diameter is made supremely small.

In this connection, average particle diameter of the cathode catalyst and the anode catalyst represents average value of crystal particle diameter determined by half bandwidth of the diffraction peak of the cathode catalyst or the anode catalyst in x-ray diffraction, or by particle diameter of the cathode catalyst or the anode catalyst examined by transmission electron microscope image.

The conductive carbon material is carbon material having function as a carrier of the cathode catalyst and conductivity, and may also be called as conductive carbon. Electron transfer at a moiety where an electrode reaction practically proceeds is carried out through the conductive carbon material. As the conductive carbon material of the cathode catalyst layer, although not especially limited, graphitized carbon black preferably is used. Usual carbon black, although having higher hydrophobicity compared with that of an oxide, and the like, has hydrophylicity due to presence of small amount of functional groups such as a hydroxyl group or a carboxyl group at the surface. On the other hand, graphitized carbon black, due to having decreased amount of a hydrophilic functional group, improves hydrophobicity. Use of carbon black with improved hydrophobicity is capable of improving drainage of the electrode catalyst layer, which in turn improves cell performance of PEFC.

As the carbon black, although not especially limited as long as it is a general one conventionally used, channel black, furnace black, thermal black, Ketjenblack, Black Pearls, and the like preferably is included. In addition, a commercially available one can be used as the carbon black, including oil furnace black such as Vulcan XC-72, Vulcan P, Black Pearls 880, Black Pearls 1100, Black Pearls 1300 and Black Pearls 2000, REGAL 400 manufactured from Cabot Co., Ltd., Ketjenblack EC manufactured from Lion Corp., #3150 and #3250 manufactured from Mitsubishi Chemical Corp. and the like; and acetylene black such as Denka Black manufactured from Denki Kagaku Kogyo Kabushiki Kaisyha; and the like.

The graphitization treatment is not especially limited as long as it is one generally used conventionally such as heat treatment. The heat treatment preferably is carried out under inert gas atmosphere such as nitrogen, argon and helium. In addition heat treatment temperature and heat treatment time may be determined, as appropriate, so that the resultant graphitized carbon black has desired BET surface area, because of dependency on carbon material to be used, and may be carried out at 2000 to 3000° C. for about 5 to 20 hours.

Graphitization degree of the graphitized carbon black may be not lower than 75%, and preferably 80 to 95%. By adopting this range, functional groups at the surface of carbon black can be reduced, which can not only secure water-repellent property but also improve corrosion resistance and electric conductivity by change in crystal structure.

As the graphitized carbon black, one having a true density of 1.80 to 2.11 g/cm$^3$, and lattice spacing, $d_{002}$, of 3.36 to 3.55 Å preferably is used.

In the present invention, lattice spacing, $d_{002}$, of the graphitized carbon black is plane distance of a hexagonal network plane based on graphite structure of carbon black, and represents average value of half inter-layer distance of lattice constant in the "c" axis direction, which is a perpendicular direction of the hexagonal network plane.

In the graphitized carbon black obtained by some way such as heat treatment, a graphitized layer composed of 3D crystal lattice similar to graphite structure is formed at the surface, and fine inter-crystal lattice space moiety decreases with progress of graphitization, and thus crystal structure of the conductive carbon material approaches to crystal structure of graphite. In consideration of corrosion resistance in addition to water-repellent property, crystallinity of conductive carbon material to be used preferably is as high as possible.

When a true density of the graphitized carbon black is below 1.80 g/cm$^3$ and lattice spacing, $d_{002}$, is over 3.55 Å, in many cases graphite structure may not sufficiently be developed, and high corrosion resistance and electron conductivity could not be obtained. In addition, when a true density is over 2.11 g/cm$^3$ and lattice spacing, $d_{002}$, is below 3.36 Å, in many cases graphite structure may excessively be developed, and sufficient specific surface area could not be obtained.

Therefore, as the graphitized carbon black, one having a true density of 1.80 to 2.11 g/cm$^3$, and a lattice spacing, $d_{002}$, of 3.36 to 3.55 preferably is used, and more preferably one with a true density of 1.90 to 2.11 g/cm$^3$, and a lattice spacing, $d_{002}$, of 3.38 to 3.53 Å, and particularly preferably one with a true density of 1.90 to 2.11 g/cm$^3$, and a lattice spacing, $d_{002}$, of 3.40 to 3.51 Å is used In this connection, in the present invention, true density is a value measured by a vapor phase replacement method using helium, and lattice spacing, $d_{002}$, is a value measured by Gakushin method (Michio Inagaki, "Carbon" No. 36, 25-34 (1963)) using an X-ray diffraction method.

In addition, as the graphitized carbon black, one having an electric conductivity of 50 to 1000 S/cm, preferably 100 to 1000 S/cm is used.

The graphitized carbon black is required not only to support the cathode catalyst but also have function as a power collecting body to take out electrons to an external circuit, or take in electrons from an external circuit, to be used as the electrode catalyst of a high performance fuel cell. An electric conductivity of the graphitized carbon black of below 50 S/cm may incur high internal resistance of a fuel cell, and lower cell performance, while an electric conductivity of over 1000 S/cm may promote crystallization of carbon black and decrease BET surface area.

In the present invention, electric conductivity of the graphitized carbon black is a value measured at 25° C. after compression molding the graphitized carbon black under 14 to 140 MPa similarly by a usual method, and then heat treatment at 1000° C. under nitrogen atmosphere.

In the present invention, the graphitized carbon black preferably contains the graphitized carbon black (A) having a BET surface area of preferably not smaller than 100 m$^2$/g, more preferably 100 to 300 m$^2$/g and particularly preferably 120 to 250 m$^2$/g. By using the graphitized carbon black (A), the cathode electrode catalyst excellent in catalytic activity can be obtained, due to having not only excellent drainage but also corrosion resistance, and further good dispersion of the cathode catalyst supported thereon.

Amount of the supported catalyst in the graphitized carbon black (A) is not especially limited. The amount of the supported catalyst may be determined, as appropriate, so that desired power generation characteristics is obtained, by kind of the cathode catalyst, performance of the membrane-electrode assembly and kind of the graphitized carbon black (A). Specifically, when the graphitized carbon black (A) supporting the cathode catalyst is used as the cathode electrode catalyst (C), the amount of the supported cathode catalyst in the cathode electrode catalyst (C) based on total mass of the cathode electrode catalyst (C) is preferably 20 to 80% by mass, more preferably 40 to 60% by mass. The amount of the supported catalyst to be in this range is capable of suppressing for oxygen generating at the vicinity of the platinum catalyst to contact with carbon surface, and thus oxidative corrosion thereof, when exposed to high voltage.

As the conductive carbon material in the cathode catalyst layer, graphitized carbon black (B) having a BET surface area of preferably smaller than 100 m$^2$/g, and more preferably 80 to 100 m$^2$/g preferably is contained in addition to the graphitized carbon black (A). The graphitized carbon black (B) is excellent not only water-repellent property but also, in particular, corrosion resistance. Therefore, use of the graphitized carbon black (A) and the graphitized carbon black (B) as carriers of the cathode catalyst is capable of providing high catalytic activity by the graphitized carbon black (A), and further improved corrosion resistance by the graphitized carbon black (B), resulting in the membrane-electrode assembly with excellent power generation performance and durability.

Amount of the supported catalyst by the graphitized carbon black (B) is not especially limited and specifically, when the graphitized carbon black (B) supporting the cathode catalyst is used as the cathode electrode catalyst (D), the amount of the supported cathode catalyst in the cathode electrode catalyst (D) is preferably 10 to 50% by mass, more preferably 10 to 30% by mass based on total mass of the cathode electrode catalyst (D). The amount of the supported catalyst to be in this range is capable of providing the cathode catalyst having both corrosion resistance and catalytic activity.

In the case when the graphitized carbon black (A) and the graphitized carbon black (B) are used as conductive carbon material which is a carrier of the cathode electrode catalyst, to satisfy both durability and catalytic performance of the cathode catalyst, along with to reduce decreasing degree of catalytic activity over time, the cathode catalyst to be supported on the graphitized carbon black (A) and the graphitized carbon black (B) is preferably supported to each after adjustment of average particle diameter.

Specifically, average particle diameter of the cathode catalyst on the graphitized carbon black (A) is 2 to 8 nm, and preferably is 3 to 6 nm. The average particle diameter below 2 nm may not provide high catalytic activity at the initial stage of power generation, and the average particle diameter over 8 nm provides excessively large particle diameter of the cathode catalyst supported, which may result in too small activated surface area and oppositely reduce catalytic activity. In addition, average particle diameter of the cathode catalyst to be supported on the graphitized carbon black (B) is 4 to 10 nm, and preferably is 4 to 8 nm. The average particle diameter below 4 nm may not sufficiently suppress reduction over time of catalytic activity, while over 8 nm is too large as particle diameter of the cathode catalyst supported and reduces activated surface area which may oppositely reduce catalytic activity.

In the cathode catalyst layer, to further improve durability and power generation performance of the membrane-electrode assembly, the cathode electrode catalyst (C) to be composed of the cathode catalyst supported on the graphitized carbon black (A), and the cathode electrode catalyst (D) to be composed of the cathode catalyst supported on the graphitized carbon black (B) preferably is mixed by specified ratio.

Namely, in the cathode catalyst layer, the cathode electrode catalyst (C) and the cathode electrode catalyst (D) is mixed in preferably not smaller than 60/40 as mass ratio (C)/(D), more preferably 60/40 to 99/1, particularly preferably 80/20 to 99/1, and further preferably 85/15 to 95/5. The mixing ratio of the cathode electrode catalyst (C) and the cathode electrode catalyst (C) below 60/40, as mass ratio (C)/(D), could lower power generation performance, and therefore the ratio preferably is within the above range.

In the cathode catalyst layer, water generating with progress of an electrode reaction is labile to transfer with flow of fuel gas supplied. Under the operation condition of high current density or high humidification, deterioration of the cathode electrode catalyst tends to be serious from upstream toward downstream of a gas flow channel in the cathode catalyst layer, caused by much amount of generating water retained at the vicinity of a gas discharge portion of the cathode catalyst layer, which inhibits progress of the electrode reaction. Therefore, in the cathode catalyst layer, when the cathode electrode catalyst (C) and the cathode electrode catalyst (D) are contained, composition of the cathode electrode catalyst preferably is optimized from upstream toward downstream of the gas flow channel.

Namely, at the downstream side of the gas flow channel of the cathode catalyst layer, mass ratio (C)/(D) of the cathode electrode catalyst (C) and the cathode electrode catalyst (D) preferably is smaller than mass ratio (C)/(D) of the cathode electrode catalyst (C) and the cathode electrode catalyst (D) at the upstream side of the gas flow channel of the cathode catalyst layer.

Specifically, ratio of mass ratio (C)/(D) (=$R_{up}$) between the cathode electrode catalyst (C) and the cathode electrode catalyst (D) at the upstream side of the gas flow channel of said cathode catalyst layer, and mass ratio (C)/(D) (=$R_{down}$) between the cathode electrode catalyst (C) and the cathode electrode catalyst (D) at the downstream side of the gas flow channel of said cathode catalyst layer, i.e. $R_{up}/R_{down}$ preferably is not smaller than 1/1, more preferably 2/1 to 9/1, and particularly preferably 3/1 to 6/1.

By adopting such range, the cathode catalyst layer without bias in the electrode reaction inside the cathode catalyst layer, and with desired performance maintained for a long period can be prepared.

In this connection, the upstream side of gas flow channel of the cathode catalyst layer is defined as the vicinity of entrance and the downstream side of gas flow channel of the cathode catalyst layer is defined as the vicinity of exit portions of fuel gas. Specific range thereof and the like may be determined in consideration of characteristics of the resulting catalyst layer.

In addition, in the present invention, hydrophobicity-treated carbon black using a fluorine compound may further be used as the conductive carbon material of the cathode catalyst layer. By using such carbon black, hydrophobicity of the cathode catalyst layer can further be improved. Use amount of the hydrophobicity-treated carbon black using a fluorine compound preferably is 1 to 20% by mass based on total mass of the conductive carbon material of the cathode catalyst layer. By formulation of the amount within this range, high power generation performance can be expressed from the initial stage to after long period of operation, and covering from low current density to high current density, and improved durability and long life property can be attained. In this connection, as an example of hydrophobized treatment, a method for treating carbon black with polytetrafluoroethylene is included.

In addition, a carbon nanotube, a carbon nanofiber or a carbon nanohorn is further used as the conductive carbon material of the cathode catalyst layer. By the addition of a carbon nanotube, a carbon nanofiber or a carbon nanohorn having higher graphitization degree than carbon black, hydrophobicity in the cathode catalyst layer can be improved and destruction of three phase structure caused by deterioration can be suppressed. Depending on the case, 2 or 3 kinds of a carbon nanotube, a carbon nanofiber or a carbon nanohorn may be used in combination. Use amount of a carbon nanotube, a carbon nanofiber or a carbon nanohorn is 1 to 20% by mass based on total mass of the conductive carbon material of the cathode catalyst layer. By formulation of the amount within this range, high power generation performance can be expressed from the initial stage to after long period of operation, and covering from low current density to high current density, and therefore improved durability and long life property can be attained.

A proton conductive polymer electrolyte used in the cathode catalyst layer and the anode catalyst layer fulfills a role to enhance mobility of protons transferring between the cathode (air electrode) and the anode (fuel electrode) in power generation of PEFC.

A polymer electrolyte is not especially limited as long as it is one generally used in the catalyst layer. Specifically, polymer electrolytes such as a perfluorocarbon polymer having a sulfonic acid group, for example Nafion™ (manufactured from DuPont Co., Ltd.); a hydrocarbon based polymer compound doped with an inorganic acid such as phosphoric acid; an organic/inorganic hybrid polymer substituted with a proton conductive functional group at a part thereof; a proton conductor composed of polymer matrix impregnated with a phosphoric acid solution or a sulfuric acid solution; and the like are included.

A solid polymer electrolyte membrane is an ion conductive membrane present between the cathode catalyst layer and the anode catalyst layer. The solid polymer electrolyte membrane is not especially limited, and a membrane composed of a proton conductive electrolyte similar to one used in the electrode catalyst layer may be used. For example, a solid polymer electrolyte membrane generally available on the market, such as a perfluorosulfonic acid membrane represented by various Nafion™ manufactured by DuPont Co., Ltd. or Flemion™, can be used. A membrane made of a polymeric microporous membrane impregnated with a liquid electrolyte, a membrane made of a porous body filled with a polymer electrolyte, and the like may be used. A polymer electrolyte used in the solid polymer electrolyte membrane and a proton conductive electrolyte used in the electrode catalyst layer may be the same or different, however, the same one preferably is used in view of improvement of adhesion between the electrode catalyst layer and the solid polymer electrolyte membrane.

Thickness of the solid polymer electrolyte membrane may be determined, as appropriate, in consideration of characteristics of the resulting MEA, however, preferably is not too thin in view of strength in membrane production or durability in usage, and preferably is not too thick in view of output characteristics in usage. Specifically, thickness of the solid polymer electrolyte membrane is preferably 5 to 300 μm, more preferably 10 to 200 μm and particularly preferably 15 to 100 μm.

The anode catalyst layer contains the anode catalyst, the conductive carbon material for supporting the anode catalyst, and the proton conductive polymer electrolyte.

The anode catalyst is material fulfilling a role to promote a reaction at the anode side (fuel electrode) of PEFC. Kind of the anode catalyst is not especially limited as long as capable of providing action as the anode catalyst. Platinum or a platinum alloy or the other catalyst may be used, similarly as the cathode catalyst. For example, a catalyst selected from a group consisting of a metal such as platinum, ruthenium, iridium, rhodium, palladium, osmium, tungsten, lead, iron, chromium, cobalt, nickel, manganese, vanadium, molybdenum, gallium and aluminum, and an alloy thereof may be used. Two or more kinds thereof may be used in combination.

The conductive carbon material of the anode catalyst layer is not especially limited, and preferably carbon black, more preferably graphitized carbon black is used. In the anode catalyst layer, carbon corrosion generates less than in the cathode catalyst layer, even if not graphitized carbon black is used, and high power generation performance, improved durability and long life property can be attained from the initial stage to long period of operation, along with covering from low current density to high current density. Graphitized carbon black improves hydrophobicity due to having decreased amount of hydrophilic functional groups. When carbon black with improved hydrophobicity is used, water content in the anode catalyst layer tends to be decreased, namely, tends to be easily dried, during air purging operation of the anode catalyst layer in stop operation of PEFC.

The amount of supported catalyst in the conductive carbon material in the anode catalyst layer is not especially limited, and may be determined so that desired power generation characteristics can be obtained, by kind of the anode catalyst, performance of the membrane-electrode assembly, kind of the conductive carbon material, and the like. For example, when the conductive carbon material supporting the anode catalyst is used as the anode electrode catalyst, the amount of the supported anode catalyst in the anode electrode catalyst preferably is 30 to 70% by mass based on total amount of the anode electrode catalyst. Use of the amount of the supported catalyst within this range improves utilization ratio of platinum, which makes possible the anode catalyst layer thinner.

As fundamental composition of the membrane-electrode assembly of the present invention, such a composition preferably is included that the cathode catalyst layer, the solid polymer electrolyte membrane and the anode catalyst layer are arranged in this order. As a more preferable composition of the membrane-electrode assembly, a gas diffusion layer preferably is arranged at the exterior side of either of the cathode catalyst layer and the anode catalyst layer, and the gas diffusion layer more preferably is arranged at the exterior sides of both of the cathode catalyst layer and the anode catalyst layer. By adopting the above composition, gas supplied from outside can more uniformly be supplied to the electrode catalyst layer, and power generation performance of the membrane-electrode assembly can further be improved.

Composition material of the gas diffusion layer is not especially limited. For example, conductive and porous sheet-like material, such as carbon-based fabric, paper-like material obtained by paper making, felt, nonwoven fabric are included. In more specifically, carbon paper, carbon cloth, carbon nonwoven fabric, and the like are used. Water-repellent treated carbon paper preferably is used.

As water-repellent treated sheet-like material preferably used in the gas diffusion layer such as water-repellent treated carbon paper, sheet-like material containing a water repellent agent is included. As the water repellent agent, fluorine-based polymeric material such as polytetrafluoroethylene (PTFE), polyvinylidene fluoride (PVDF), polyhexafluoropropylene, a copolymer of tetrafluoroethylene and hexafluoropropylene (FEP); polypropylene, polyethylene, and the like are preferably included.

As the gas diffusion layer, carbon paper with a thickness of not thicker than 400 μm, or water-repellent treated carbon paper preferably is used, and it may be determined, as appropriate, in consideration of characteristics of the resultant gas diffusion layer. In view of water-repellent property of the gas diffusion layer, the gas diffusion layer with a thickness of not thicker than 200 μm more preferably is used. The lower limit of thickness of the gas diffusion layer is not especially limited, however, a too thin layer may not provide sufficient mechanical strength, and therefore a thickness not thinner than 100 μm is desirable.

In addition, to prevent flooding in the membrane-electrode assembly, a mil layer may be arranged between the gas diffusion layer, and the cathode catalyst layer and the anode catalyst layer. The mil layer represents a mixture layer composed of carbon and a water repellent fluorocarbon resin such as polytetrafluoroethylene, formed at the surface of the gas diffusion layer.

The second aspect of the present invention is a proton-exchange membrane fuel cell (PEFC) using the membrane-electrode assembly for a fuel cell of the first aspect of the present invention. In PEFC of the present invention, the catalyst layer is hard to be deteriorated in the membrane-electrode assembly and is excellent in durability. Namely, in PEFC of the present invention, voltage reduction is little even after PEFC is used for a long period. Such characteristics are particularly useful in applications requiring durability over a long period. Such applications include a vehicle such as an automobile. PEFC of the present invention, due to maintaining power generation characteristics over a long period, is capable of attaining longer lifetime or value improvement of vehicle mounted with PEFC of the present invention. PEFC of the present invention preferably is used as various power sources, and use as a power source of a vehicle particularly be preferable.

Composition of PEFC is not especially limited, and conventionally well-known technology may be utilized, as appropriate, and generally, has structure that MEAs are sandwiched by separators. Specifically, such composition is included wherein the separator, the gas diffusion layer, the cathode catalyst layer, the solid polymer electrolyte membrane, the anode catalyst layer, the gas diffusion layer and the separator are arranged in this order. However, the present invention should not be limited to such fundamental composition, and the present invention is applicable to also PEFC having other composition.

Material of the separator is not especially limited, and well-known ones such as a carbon-based separator such as fine carbon graphite or a carbon plate, a metal-based separator such as a stainless steel-based separator, and the like can be used. Thickness or size of the separator, shape of a flow channel, and the like are not especially limited, and may be determined, as appropriate, in consideration of output characteristics of the resultant fuel cell.

Furthermore, to obtain desired voltage of a fuel cell, and the like, a plurality of MEAs may be laminated via separators in series to form a stack. Shape of a fuel cell and the like are not especially limited, and may be determined, as appropriate, so that desired voltage and the like can be obtained.

EXAMPLE

Working Example 1

1. Preparation of an Anode Electrode Catalyst

As conductive carbon material, 4.0 g of carbon black (Ketjenblack™ EC produced from Ketjen Black International Co., Ltd.; BET surface area=800 m²/g) was prepared, and 400 g of an aqueous solution of dinitrodiamine platinum (a Pt concentration of 1.0%) was added thereto and stirred for 1 hr. Further, 50 g of methanol was added as a reducing agent and stirred for 1 hr. Subsequently, the solution was warmed to 80° C. taking 30 minutes, followed by stirring at 80° C. for 6 hrs and cooling to room temperature taking 1 hr. The precipitate was filtered, and then the resultant solid substance was dried at 85° C. for 12 hrs under reduced pressure, and crushed in a mortar to yield an anode electrode catalyst (an average particle diameter of Pt particles of 2.6 nm, and a Pt supporting concentration of 50% by mass).

2. Preparation of a Cathode Electrode Catalyst

By graphitization treatment of carbon black (Ketjenblack™ EC produced from Ketjen Black International Co., Ltd.) at 2700° C. for 10 hours, graphitized carbon black (graphitized Ketjenblack™ EC; BET surface area=130 m²/g, true density=1.93 g/cm³, lattice spacing, $d_{002}$, =3.51 Å, electric conductivity=200 S/cm) was yielded. To 4.0 g of the graphitized Ketjenblack, 400 g of an aqueous solution of dinitrodiamine platinum (a Pt concentration of 1.0%) was added and stirred for 1 hr. Further, 50 g of formic acid was mixed as a reducing agent and stirred for 1 hr. Subsequently, the solution was warmed to 40° C. taking 30 minutes, followed by stirring at 40° C. for 6 hrs, warming to 60° C. taking 30 minutes, further stirring at 60° C. for 6 hrs and cooling to room temperature taking 1 hr. The precipitate was filtered, and then the resultant solid substance was dried at 85° C. for 12 hrs under reduced pressure, and crushed in a mortar to yield a cathode electrode catalyst (an average particle diameter of Pt particles of 4.8 nm, and a Pt supporting concentration of 50% by mass).

3. Preparation of an Anode Catalyst Layer

Purified water of 5 times mass based on mass of the anode electrode catalyst was added, and subjected to defoaming operation under reduced pressure for 5 minutes. To this solution, 0.5 times mass of n-propyl alcohol was added, and further a solution containing a proton conductive polymer electrolyte (containing 20% by weight of Nafion™ produced from DuPont Co., Ltd.) was added. As content of the polymer electrolyte in the solution, one having mass ratio of solid content to the mass of carbon of the anode electrode-catalyst, Carbon/Ionomer=1.0/0.9, was used.

The resultant mixture slurry was sufficiently dispersed by an ultrasonic homogenizer and subjected to defoaming operation under reduced pressure to yield catalyst slurry. This catalyst slurry was printed in the amount responsive to desired thickness, at the one surface of a polytetrafluoroethylene sheet by a screen printing method, which was then dried at 60° C. for 24 hours. Size of the anode catalyst layer to be formed was set to be 5 cm×5 cm. In addition, the coating layer on the polytetrafluoroethylene sheet was adjusted so that a Pt amount of 0.05 mg/cm² is obtained.

4. Preparation of a Cathode Catalyst Layer

Purified water of 5 times mass based on mass of the cathode electrode catalyst was added, and subjected to defoaming operation under reduced pressure for 5 minutes. To this solution, 0.5 times mass of n-propyl alcohol was added, and further a solution containing a proton conductive polymer electrolyte (containing 20% by weight of Nafion™ produced from DuPont Co., Ltd.) was added. As content of the polymer electrolyte in the solution, one having mass ratio of solid content to the mass of carbon of the cathode electrode catalyst, Carbon/Ionomer=1.0/0.9, was used.

The resultant mixture slurry was sufficiently dispersed by an ultrasonic homogenizer and subjected to defoaming operation under reduced pressure to yield catalyst slurry. This catalyst slurry was printed in the amount responsive to desired thickness, at the one surface of a polytetrafluoroethylene sheet by a screen printing method, which was then dried at 60° C. for 24 hours. Size of the cathode catalyst layer to be formed was set to be 5 cm×5 cm. In addition, the coating layer on the polytetrafluoroethylene sheet was adjusted so that a Pt amount of 0.35 mg/cm² is obtained.

5. Preparation of Membrane-Electrode Assembly (MEA)

Nafion™ 111 (a membrane thickness of 25 μm) as a solid polymer electrolyte membrane, and the electrode catalyst layer, formed on the polytetrafluoroethylene sheet in advance, were laminated together. In this procedure, the anode catalyst layer, the solid polymer electrolyte membrane and the cathode catalyst layer were laminated in this order. Subsequently, the laminated substance was subjected to hot pressing at 130° C. for 10 minutes under 2.0 MPa to yield MEA by peeling only the polytetrafluoroethylene sheet.

The cathode catalyst layer transcribed on the solid polymer electrolyte membrane had a thickness of about 12 μm, a Pt supporting amount of 0.35 mg per apparent electrode surface area of 1 cm², and an electrode area of 25 cm². The anode catalyst layer had a thickness of about 1.5 μm, a Pt supporting amount of 0.05 mg per apparent electrode surface area of 1 cm², and an electrode area of 25 cm².

6. Performance Evaluation of a Membrane-Electrode Assembly (MEA)

At the both sides of the resultant MEA, carbon paper (a size of 6.0 cm×5.5 cm, and a thickness of 320 μm) as the gas diffusion layer, and a gas separator with a gas flow channel were arranged, and further it was sandwiched with power collecting plates made of gold plated stainless steel to prepare a unit cell for evaluation. To the anode side of the unit cell for evaluation was supplied hydrogen as fuel, and to the cathode side thereof was supplied air as an oxidizing agent. Supplying pressure of both gases was set to atmospheric pressure, and hydrogen was set to be 58.6° C. and a relative humidity of 60%, and air to be 54.8° C. and a relative humidity of 50%, and cell temperature was set at 70° C. In addition, utilization rate of hydrogen was set to be 67%, and utilization rate of air was set to be 40%. Cell voltage measured in power generation at a current density of 1.0 A/cm² under these conditions, was used as initial stage cell voltage.

Subsequently, after 60 seconds of power generation, power generation was stopped. After the stopping, supplying of hydrogen and air was also stopped and the cell was purged with air and stood still for 50 seconds. Then, hydrogen gas was supplied to the anode side for 10 seconds at ⅕ of the utilization rate. Then, hydrogen gas and air were supplied to the anode side and the cathode side, respectively under the similar condition as in the above, and again power generation was continued for 60 minutes under a current density of 1.0 A/cm². In addition, load current here was increased from 0 A/cm² to 1 A/cm² taking 30 seconds. After carrying out this power generation-stop operation, cell voltage was measured to evaluate power generation performance. Cycle number till cell voltage became 0.45 V under a current density of 1.0 A/cm² was used as evaluation value of durability. The compositions and results are shown in Table 1-1. In addition, heat treatment temperature in graphitization treatment, BET specific surface area, true density, lattice spacing, $d_{002}$, and electric conductivity of the conductive carbon material used in the cathode electrode catalyst are summarized in Table 4.

Working Examples 2 to 25 and Examples 1 to 5

Similarly as in Working Example 1 except that compositions of fuel cells were changed as shown in Table 1-1 and Table 1-2, MEAs were prepared and durability was evaluated. Compositions and results are shown in Table 1-1 and Table 1-2. In addition, heat treatment temperature in graphitization treatment, BET specific surface area, true density, lattice spacing, $d_{002}$, and electric conductivity of the conductive carbon material used in the cathode electrode catalyst are summarized in Table 4.

Working Example 26

1. Preparation of a Cathode Electrode Catalyst

Similarly as in Working Example 1, the cathode electrode catalyst was prepared and this was used as the cathode electrode catalyst (C).

Then, by graphitization treatment of carbon black (Vulcan XC-72 produced from Cabot Co., Ltd.) at 2700° C. for 10 hours, graphitized carbon black (graphitized Vulcan XC-72; BET surface area=113 m²/g, true density=2.01 g/cm³, lattice spacing, $d_{002}$, =3.46 Å, electric conductivity=300 S/cm) was yielded. To 4.0 g of the graphitized carbon black, 400 g of an aqueous solution of dinitrodiamine platinum (a Pt concentration of 1.0%) was added and stirred for 1 hr. Further, 50 g of formic acid was mixed as a reducing agent and stirred for 1 hr. Subsequently, the solution was warmed to 40° C. taking 30 minutes, followed by stirring at 40° C. for 6 hrs, warming to 60° C. taking 30 minutes, further stirring at 60° C. for 6 hrs and cooling to room temperature taking 1 hr. The precipitate was filtered, and then the resultant solid substance was dried at 85° C. for 12 hrs under reduced pressure, and crushed in a mortar to yield an cathode electrode catalyst (D) (an average particle diameter of Pt particles of 4.8 nm, and a Pt supporting concentration of 50% by mass).

2. Preparation of a Cathode Catalyst Layer

Purified water of 5 times mass based on mass of the mixture obtained by mixing the electrode catalyst (C) and the electrode catalyst (D) in mass ratio (C)/(D)=2/1, was added, and subjected to defoaming operation under reduced pressure for 5 minutes. To this solution, 0.5 times mass of n-propyl alcohol was added, and further a solution containing a proton conductive polymer electrolyte (containing 20% by weight of Nafion™ produced from DuPont Co., Ltd.) was added. As content of the polymer electrolyte in the solution, one having mass ratio of solid content to the mass of carbon of the mixture (the electrode catalyst (C) and (D)), Carbon/Ionomer=1.0/0.9, was used. The resultant mixture slurry was sufficiently dispersed by an ultrasonic homogenizer and subjected to defoaming operation under reduced pressure to yield catalyst slurry.

Similarly as in Working Example 1, except by using the above catalyst slurry, the cathode catalyst layer was prepared at the one surface of the polytetrafluoroethylene sheet, to yield MEA using thereof and evaluated. Compositions and results are shown in Table 2. In addition, heat treatment temperature in graphitization treatment, BET specific surface area, true density, lattice spacing, $d_{002}$, and electric conductivity of the conductive carbon material used in the cathode electrode catalyst are summarized in Table 5.

Working Examples 27 to 33

Similarly as in Working Example 26 except that compositions of fuel cells were changed as shown in Table 2, MEAs were produced and durability was evaluated. Compositions and results are shown in Table 2. In addition, heat treatment temperature in graphitization treatment, BET specific surface area, true density, lattice spacing, $d_{002}$, and electric conductivity of the conductive carbon material used in the cathode electrode catalyst are summarized in Table 5.

Working Example 34

1. Preparation of a Cathode Catalyst Layer

The electrode catalyst (C) prepared in Working Example 0.1 and the electrode catalyst (D) prepared in Working Example 26 were mixed in mass ratio (C)/(D)=9/1, and by using the resultant mixture, similarly as in Working Example 26, a catalyst slurry for the upstream side of the gas flow channel (upstream gas side) was prepared.

The electrode catalyst (C) prepared in Working Example 1 and the electrode catalyst (D) prepared in Working Example 26 were mixed in mass ratio (C)/(D)=8/2, and by using the resultant mixture, similarly as in Working Example 26, a catalyst slurry for the downstream side of the gas flow channel (downstream gas side) was prepared.

Similarly as in Working Example 1 except by using the above catalyst slurry, the catalyst slurry for the upstream gas side was coated at half (a size of 5.0 cm×2.5 cm) of the one surface of the polytetrafluoroethylene sheet, and by drying thereof at 60° C. for 24 hours, the upstream side cathode catalyst layer was prepared.

Then, by coating the catalyst slurry for the downstream gas side was coated at the residual half (a size of 5.0 cm×2.5 cm) of the one surface of the polytetrafluoroethylene sheet, and by drying thereof at 60° C. for 24 hours, the downstream side cathode catalyst layer was prepared.

MEA was prepared using thereof and evaluated. Compositions and results are shown in Table 3. In addition, heat treatment temperature in graphitization treatment, BET specific surface area, true density, lattice spacing, $d_{002}$, and electric conductivity of the conductive carbon material used in the cathode electrode catalyst (C) and (D) are summarized in Table 6.

In the cathode catalyst layer, electrode surface areas formed by coating the catalyst slurry for the upstream gas side and the catalyst slurry for the downstream gas side were each 12.5 cm$^2$, and thicknesses were each 12 μm and Pt supporting amount per apparent electrode surface of 1 cm$^2$ were each 0.35 mg.

In addition, in evaluation of durability of the cell for evaluation, the portion coated with the catalyst slurry for the upstream gas side was arranged at the gas entrance port side in the cathode catalyst layer, and the portion coated with the catalyst slurry for the downstream gas side was arranged at the gas exit side.

Working Examples 35 to 41

Similarly as in Working Example 34, except by changing compositions of fuel cells as shown in Table 3, MEAs were produced and evaluated. Compositions and results are shown in Table 3. In addition, heat treatment temperature in graphitization treatment, BET specific surface area, true density, lattice spacing, $d_{002}$, and electric conductivity of the conductive carbon material used in the cathode electrode catalyst (C) and (D) are summarized in Table 6.

TABLE 1-1

| | Anode electrode catalyst type Catalyst CCM | Cathode electrode catalyst type Catalyst CCM | Supported catalyst amount (mg/cm$^2$) A | Supported catalyst amount (mg/cm$^2$) C | Anode Catalyst layer Average Thickness Ya (μm) | Cathode catalyst layer Average thickness Yc (μm) | Ya/Yc (—) | GDL Thickness (μm) | Start-stop Times (time) |
|---|---|---|---|---|---|---|---|---|---|
| Work Exl 1 | Pt 50 wt % KB EC | Pt 50 wt % GKB EC | 0.05 | 0.35 | 1.5 | 12.0 | 0.13 | 320 | 2,450 |
| Work Exl 2 | Pt 50 wt % KB EC | Pt 50 wt % GKB EC | 0.10 | 0.35 | 3.2 | 12.0 | 0.27 | 320 | 2,670 |
| Work Exl 3 | Pt 50 wt % KB EC | Pt 50 wt % GKB EC | 0.15 | 0.35 | 5.0 | 12.0 | 0.42 | 320 | 2,760 |
| Work Exl 4 | Pt 40 wt % KB EC | Pt 50 wt % GKB EC | 0.05 | 0.35 | 1.9 | 12.0 | 0.16 | 320 | 2,570 |
| Work Exl 5 | Pt 30 wt % KB EC | Pt 50 wt % GKB EC | 0.05 | 0.35 | 2.6 | 12.0 | 0.22 | 320 | 2,650 |
| Work Exl 6 | Pt 20 wt % KB EC | Pt 50 wt % GKB EC | 0.05 | 0.35 | 3.8 | 12.0 | 0.32 | 320 | 2,710 |
| Work Exl 7 | Pt 10 wt % KB EC | Pt 50 wt % GKB EC | 0.05 | 0.35 | 7.5 | 12.0 | 0.63 | 320 | 2,605 |
| Work Exl 8 | Pt 40 wt % KB EC | Pt 30 wt % GKB EC | 0.05 | 0.35 | 1.9 | 20.0 | 0.09 | 320 | 2,745 |
| Work Exl 9 | Pt 50 wt % KB EC | Pt 50 wt % GKB EC + PTFEV XC-72 (10 wt %) | 0.05 | 0.35 | 2.0 | 14.4 | 0.14 | 320 | 3,450 |
| Work Exl 10 | Pt 50 wt % KB EC | Pt 50 wt % GKB EC + CNF (10 wt %) | 0.05 | 0.35 | 2.0 | 14.4 | 0.14 | 320 | 3,630 |
| Work Exl 11 | Pt 50 wt % KB EC | Pt 50 wt % GKB EC + CNT (10 wt %) | 0.05 | 0.35 | 2.0 | 14.4 | 0.14 | 320 | 3,550 |
| Work Exl 12 | Pt 50 wt % KB EC | Pt 50 wt % GKB EC + CNH (10 wt %) | 0.05 | 0.35 | 2.0 | 14.4 | 0.14 | 320 | 3,870 |
| Work Exl 13 | Pt 50 wt % V XC-72 | Pt 50 wt % GKB EC | 0.05 | 0.35 | 2.0 | 12.0 | 0.17 | 320 | 3,550 |
| Work Exl 14 | Pt 50 wt % AB | Pt 50 wt % GKB EC | 0.05 | 0.35 | 2.0 | 12.0 | 0.17 | 320 | 3,370 |

(Note)
Work Exl: Working Example, CCM: Conductive carbon material, A: Anode, C: Cathode KB EC: Ketjenblack EC, V XC-72: Vulkan XC-72 AB: acetylene black, GKB EC: Graphitized Ketjenblack EC, PTFEV: PTFE treated Vulkan CNF: Carbon nanofiber, CNT: Carbon nanotube, CNH: Carbon nanohorn

TABLE 1-2

| | Anode electrode catalyst type Catalyst CCM | Cathode Electrode catalyst type Catalyst CCM | Supported catalyst amont (mg/cm²) A | C | Anode Catalyst layer Average Thickness Ya (μm) | cathode catalyst layer Average thickness Yc (μm) | Ya/Yc (—) | GDL Thickness (μm) | Start-stop times (time) |
|---|---|---|---|---|---|---|---|---|---|
| Work Exl 15 | Pt 50 wt % GKB EC | Pt 50 wt % GKB EC | 0.05 | 0.35 | 2.5 | 12.0 | 0.21 | 320 | 3,740 |
| Work Exl 16 | Pt 50 wt % KB EC | Pt 50 wt % GKB EC | 0.05 | 0.35 | 2.5 | 12.0 | 0.21 | 320 | 2,830 |
| Work Exl 17 | Pt 50 wt % KB EC | Pt 50 wt % GBP | 0.05 | 0.35 | 2.0 | 12.0 | 0.17 | 180 | 2,770 |
| Work Exl 18 | Pt 50 wt % KB EC | Pt 50 wt % GKB EC600JD | 0.15 | 0.35 | 6.0 | 12.0 | 0.50 | 180 | 1,950 |
| Work Exl 19 | Pt 50 wt % KB EC | Pt 50 wt % GKB EC | 0.10 | 0.35 | 2.0 | 12.0 | 0.17 | 320 | 2,230 |
| Work Exl 20 | Pt 50 wt % KB EC | Pt 50 wt % GKB EC | 0.10 | 0.35 | 2.0 | 12.0 | 0.17 | 320 | 2,480 |
| Work Exl 21 | Pt 50 wt % KB EC | Pt 50 wt % GKB EC | 0.10 | 0.35 | 2.0 | 12.0 | 0.17 | 320 | 2,550 |
| Work Exl 22 | Pt 50 wt % KB EC | Pt 50 wt % GKB EC | 0.10 | 0.35 | 2.0 | 12.0 | 0.17 | 320 | 2,980 |
| Work Exl 23 | Pt 50 wt % KB EC | Pt 50 wt % GKB EC | 0.10 | 0.35 | 2.0 | 12.0 | 0.17 | 320 | 3,130 |
| Work Exl 24 | Pt 50 wt % KB EC | Pt 50 wt % GKB EC 600JD | 0.10 | 0.35 | 2.0 | 12.0 | 0.17 | 320 | 2,540 |
| Work Exl 25 | Pt 50 wt % KB EC | Pt 50 wt % GBP | 0.10 | 0.35 | 2.0 | 12.0 | 0.17 | 320 | 2,610 |
| Exl 1 | Pt 50 wt % KB EC | Pt 50 wt % KB EC | 0.4 | 0.4 | 13.7 | 13.7 | 1.0 | 320 | 450 |
| Exl 2 | Pt 50 wt % KB EC | Pt 50 wt % GKB EC | 0.4 | 0.4 | 14 | 14 | 1.0 | 320 | 750 |
| Exl 3 | Pt 50 wt % V XC-72 | Pt 50 wt % GKB EC | 0.4 | 0.4 | 14 | 14 | 1.0 | 320 | 730 |
| Exl 4 | Pt 50 wt % KB EC | Pt 50 wt % GKB EC | 0.4 | 0.2 | 14 | 7.0 | 2.0 | 320 | 680 |
| Exl 5 | Pt 50 wt % GKB EC | Pt 50 wt % KB EC | 0.4 | 0.4 | 14 | 14 | 1.0 | 320 | 530 |

(Note)
Work Exl: Working Example, Exl: Example, CCM: Conductive carbon material, A: Anode, C: Cathode, GKB EC: Graphitized Ketjenblack EC, KB: Ketjenblack, V XC-72: Vulkan XC-72 GBP: Graphitized Black Pearls

TABLE 2

| | Anode electrode catalyst type Catalyst CCM | Cathode electrode catalyst type | | C/D (mass ratio) | Supported catalyst amount (mg/cm²) | | Anode catalyst layer Average thickness | cathode catalyst layer Average thickness | Ya/Yc (—) | GDL Thickness (μm) | Start-stop times (time) |
|---|---|---|---|---|---|---|---|---|---|---|---|
| | | Elec cat C Catalyst CCM | Elec cat D Catalyst CCM | | A | C | Ya (μm) | Yc (μm) | | | |
| Work Exl 26 | Pt 50 wt % KB EC | Pt 50 wt % GKB EC | Pt 50 wt % GV XC-72 | 2/1 | 0.10 | 0.35 | 2.0 | 12.0 | 0.17 | 320 | 3,450 |
| Work Exl 27 | Pt 50 wt % KB EC | Pt 50 wt % GKB EC 600 JD | Pt 50 wt % GV XC-72 | 2/1 | 0.10 | 0.35 | 2.0 | 12.0 | 0.17 | 320 | 3,680 |
| Work Exl 28 | Pt 50 wt % KB EC | Pt 50 wt % GBP | Pt 50 wt % GV XC-72 | 2/1 | 0.10 | 0.35 | 2.0 | 12.0 | 0.17 | 320 | 3,120 |
| Work Exl 29 | Pt 50 wt % KB EC | Pt 50 wt % GKB EC | Pt 50 wt % GAB | 2/1 | 0.10 | 0.35 | 2.0 | 12.0 | 0.17 | 320 | 3,680 |
| Work Exl 30 | Pt 50 wt % KB EC | Pt 50 wt % GKB EC | Pt 50 wt % GFB | 2/1 | 0.10 | 0.35 | 2.0 | 12.0 | 0.17 | 320 | 3,650 |
| Work Exl 31 | Pt 50 wt % KB EC | Pt 50 wt % GKB EC | Pt 50 wt % GV XC-72 | 4/1 | 0.10 | 0.35 | 2.0 | 12.0 | 0.17 | 320 | 3,020 |

TABLE 2-continued

| | Anode electrode catalyst | Cathode electrode catalyst type | | Supported catalyst | | Anode catalyst layer | cathode catalyst layer | | | |
|---|---|---|---|---|---|---|---|---|---|---|
| | type Catalyst CCM | Elec cat C Catalyst CCM | Elec cat D Catalyst CCM | C/D (mass ratio) | amount (mg/cm$^2$) A | amount (mg/cm$^2$) C | Average thickness Ya (μm) | Average thickness Yc (μm) | Ya/Yc (—) | GDL Thickness (μm) | Start-stop times (time) |
| Work Exl 32 | Pt 50 wt % KB EC | Pt 50 wt % GKB EC | Pt 50 wt % GV XC-72 | 1/1 | 0.10 | 0.35 | 2.0 | 12.0 | 0.17 | 320 | 3,860 |
| Work Exl 33 | Pt 50 wt % KB EC | Pt 30 wt % GKB EC | Pt 50 wt % GV XC-72 | 1/2 | 0.10 | 0.35 | 2.0 | 12.0 | 0.17 | 320 | 3,930 |

(Note)
Work Exl: Working Example, CCM: Conductive carbon material, Elec cat: Electrode catalyst A: Anode, C: Cathode KB: Ketjenblack, GKB: Graphitized-Ketjenblack, GBP; Graphitized Black Pearls GV XC-72: Graphitized Vulkan XC-72, GAB: Graphitized acethylene black GFB: Graphitized furnace black

TABLE 3

| | Anode electrode catalyst | Cathode electrode catalyst type | | CCL C/D | | $R_{up}/R_{down}$ | Supported catalyst | | Anode catalyst layer Ave. thickness | cathode catalyst layer Ave. thickness | Ya/Yc | GDL thickness | Start-stop times |
|---|---|---|---|---|---|---|---|---|---|---|---|---|---|
| | type Catalyst CCM | Elec cat C Catalyst CCM | Elec cat D Catalyst CCM | (mass ratio) USS | (mass ratio) DSS | (—) | amount (mg/cm$^2$) A | amount (mg/cm$^2$) C | Ya (μm) | Yc (μm) | (—) | (μm) | (time) |
| Work Exl 34 | Pt 50 wt % KB EC | Pt 50 wt % GKB EC | Pt 50 wt % GV XC-72 | 9/1 | 8/2 | 2.25/1 | 0.10 | 0.35 | 2.0 | 12.0 | 0.17 | 320 | 3,280 |
| Work Exl 35 | Pt 50 wt % KB EC | Pt 50 wt % GKB EC | Pt 50 wt % GV XC-72 | 9/1 | 7/3 | 3.86/1 | 0.10 | 0.35 | 2.0 | 12.0 | 0.17 | 320 | 3,550 |
| Work Exl 36 | Pt 50 wt % KB EC | Pt 50 wt % GKB EC | Pt 50 wt % GV XC-72 | 99/1 | 9/1 | 11/1 | 0.10 | 0.35 | 2.0 | 12.0 | 0.17 | 320 | 2,750 |
| Work Exl 37 | Pt 50 wt % KB EC | Pt 50 wt % GKB EC | Pt 50 wt % GAB | 9/1 | 9/1 | 1/1 | 0.10 | 0.35 | 2.0 | 12.0 | 0.17 | 320 | 2,890 |
| Work Exl 38 | Pt 50 wt % KB EC | Pt 50 wt % GKB EC (2500° C.) | Pt 50 wt % GKB EC (2700° C.) | 9/1 | 9/1 | 1/1 | 0.10 | 0.35 | 2.0 | 12.0 | 0.17 | 320 | 3,550 |
| Work Exl 39 | Pt 50 wt % KB EC | Pt 50 wt % GKB EC (2700° C.) | Pt 50 wt % GKB EC (2900° C.) | 9/1 | 9/1 | 1/1 | 0.10 | 0.35 | 2.0 | 12.0 | 0.17 | 320 | 2,940 |
| Work Exl 40 | Pt 50 wt % KB EC | Pt—Co 50 wt % (Pt/Co = 3/1) GKB EC (2500° C.) | Pt—Co 50 wt % (Pt/Co = 3/1) GKB EC (2700° C.) | 9/1 | 9/1 | 1/1 | 0.10 | 0.35 | 2.0 | 12.0 | 0.17 | 320 | 2,950 |
| Work Exl 41 | Pt 50 wt % KB EC | Pt—Co 50 wt % (Pt/Co = 3/1) GKB EC (2500° C.) | Pt—Co 50 wt % (Pt/Co = 3/1) GKB EC (2700° C.) | 9/1 | 8/2 | 2.25/1 | 0.10 | 0.35 | 2.0 | 12.0 | 0.17 | 320 | 3,130 |

(Note)
Work Exl: Working Example, CCM: Conductive carbon material, Elec cat: Electrode catalyst CCL: Cathode catalyst layer, USS: Upstream side, DSS: Downstream side, A: Anode, C: Cathode, KB: Ketjenblack, GKB EC: Graphitized Ketjenblack EC, GV XC-72: Graphitized Vulkan XC-72 GAB: Graphitized acetylene black,

TABLE 4

| | CCM in CEC (Heat Treatment temp) | BET surface area (m$^2$/g) | True Density (g/cm$^3$) | $d_{002}$ (Å) | Electric conductivity (S/cm) |
|---|---|---|---|---|---|
| Work Exls 1 to 16 Exls 2 to 4 | GKB EC (2700° C.) | 130 | 1.93 | 3.51 | 200 |
| Work Exl 17 | GBP (2700° C.) | 320 | 1.91 | 3.49 | 250 |
| Work Exl 18 | GKB EC 600 JD (2700° C.) | 285 | 1.85 | 3.50 | 250 |
| Work Exl 19 | GKB EC (2400° C.) | 190 | 1.80 | 3.55 | 100 |
| Work Exl 20 | GKB EC (2500° C.) | 160 | 1.85 | 3.53 | 130 |
| Work Exl 21 | GKB EC (2600° C.) | 145 | 1.90 | 3.52 | 160 |

TABLE 4-continued

|  | CCM in CEC (Heat Treatment temp) | BET surface area (m²/g) | True Density (g/cm³) | $d_{002}$ (Å) | Electric conductivity (S/cm) |
|---|---|---|---|---|---|
| Work Exl 22 | GKB EC (2800° C.) | 115 | 1.96 | 3.50 | 300 |
| Work Exl 23 | GKB EC (2900° C.) | 105 | 1.99 | 3.48 | 400 |
| Work Exl 24 | GKB EC 600 JD (2500° C.) | 270 | 1.81 | 3.53 | 180 |
| Work Exl 25 | GBP (2500° C.) | 295 | 1.83 | 3.54 | 190 |
| Exls 1, 5 | KB EC | 800 | 1.80 | — | 20 |

(Note)
Work Exl: Working Example, Exl: Example, CCM: Conductive carbon material, CEC: Cathode electrode catalyst GKB EC: Graphitized Ketjenblack EC, GBP: Graphitized Black Pearls, KB EC: Ketjenblack EC

TABLE 5

|  | CCM in CEC (Heat treatment temp) | BET surface area (m²/g) | True Density (g/cm³) | $d_{002}$ (Å) | Electric conductivity (S/cm) |
|---|---|---|---|---|---|
| Work Exl 26 | C: GKB EC (2700° C.) | 160 | 1.81 | 3.53 | 130 |
|  | D: GV XC-72 (2700° C.) | 113 | 2.01 | 3.46 | 300 |
| Work Exl 27 | C: GKB EC 600JD (2700° C.) | 285 | 1.85 | 3.50 | 250 |
|  | D: GV XC-72 (2700° C.) | 113 | 2.01 | 3.46 | 300 |
| Work Exl 28 | C: GBP (2700° C.) | 320 | 1.91 | 3.49 | 250 |
|  | D: GV XC-72 (2700° C.) | 113 | 2.01 | 3.46 | 300 |
| Work Exl 29 | C: GKB EC (2700° C.) | 130 | 1.93 | 3.51 | 200 |
|  | D: GAB (2700° C.) | 113 | 2.1 | 3.44 | 400 |
| Work Exl 30 | C: GKB EC (2500° C.) | 160 | 1.85 | 3.53 | 130 |
|  | D: GFB (2700° C.) | 118 | 2.07 | 3.47 | 450 |
| Work Exl 31 | C: GKB EC (2700° C.) | 130 | 1.93 | 3.51 | 200 |
|  | D: GV XC-72 (2900° C.) | 102 | 2.04 | 3.44 | 500 |
| Work Exl 32 | C: GKB EC (2500° C.) | 160 | 1.85 | 3.53 | 130 |
|  | D: GV XC-72 (2700° C.) | 113 | 2.01 | 3.46 | 300 |
| Work Exl 33 | C: GKB EC (2500° C.) | 160 | 1.85 | 3.53 | 130 |
|  | D: GV XC-72 (2700° C.) | 113 | 2.01 | 3.46 | 300 |

(Note)
Work Exl: Working Example, CCM: Conductive carbon material, CEC: Cathode electrode catalyst GKB EC: Graphitized Ketjenblack EC, GV XC-72: Graphitized Vulkan XC-72, GBP: Graphitized Black Pearls, GAB: Graphitized acetylene black, GFB: Graphitized furnace black

TABLE 6

|  | CCM in CEC (Heat treatment temp) | BET surface area (m²/g) | True Density (g/cm³) | $d_{002}$ (Å) | Electric conductivity (S/cm) |
|---|---|---|---|---|---|
| Work Exl 34 | C: GKB EC (2700° C.) | 160 | 1.81 | 3.53 | 130 |
|  | D: GV XC-72 (2700° C.) | 113 | 2.01 | 3.46 | 300 |
| Work Exl 35 | C: GKB EC (2700° C.) | 130 | 1.93 | 3.50 | 200 |
|  | D: GV XC-72 (2700° C.) | 113 | 2.01 | 3.46 | 300 |
| Work Exl 36 | C: GKB EC (2700° C.) | 130 | 1.93 | 3.51 | 200 |
|  | D: GV XC-72 (2700° C.) | 113 | 2.01 | 3.46 | 300 |
| Work Exl 37 | C: GKB EC (2700° C.) | 130 | 1.93 | 3.51 | 200 |
|  | D: GAB (2700° C.) | 113 | 2.1 | 3.44 | 400 |
| Work Exl 38 | C: GKB EC (2500° C.) | 160 | 1.85 | 3.53 | 130 |
|  | D: GKB EC (2700° C.) | 130 | 1.93 | 3.51 | 200 |
| Work Exl 39 | C: GKB EC (2700° C.) | 130 | 1.93 | 3.51 | 200 |
|  | D: GKB EC (2900° C.) | 105 | 1.99 | 3.46 | 400 |
| Work Exl 40 | C: GKB EC (2500° C.) | 160 | 1.85 | 3.53 | 130 |
|  | D: GKB EC (2700° C.) | 130 | 1.93 | 3.51 | 200 |
| Work Exl 41 | C: GKB EC (2500° C.) | 160 | 1.85 | 3.53 | 130 |
|  | D: GKB EC (2700° C.) | 130 | 1.93 | 3.51 | 200 |

(Note)
Work Exl: Working Example, CCM: Conductive carbon material, CEC: Cathode electrode catalyst GKB EC: Graphitized Ketjenblack EC, GV XC-72: Graphitized Vulkan XC-72

As is shown in Tables 1 to 3, PEFC of the present invention has significantly excellent durability for repeated start-stop operation.

Examples described above are those for specifically explaining the present invention, and the present invention should not be limited thereto.

Further, the present application is based on Japanese patent application No. 2004-134401 filed in Japan on Apr. 28, 2004 and Japanese patent application No. 2004-134401 filed in Japan on Feb. 21, 2005, whose disclosed contents are herein incorporated by reference in its entirety.

What is claimed is:

1. A membrane-electrode assembly for a fuel cell comprising:
   a cathode catalyst layer containing a cathode catalyst comprising platinum or a platinum alloy, a conductive carbon material supporting said cathode catalyst, and a proton conductive polymer electrolyte;
   a solid polymer electrolyte membrane; and
   an anode catalyst layer containing an anode catalyst, a conductive carbon material supporting said anode catalyst, and a proton conductive polymer electrolyte;
   wherein average thickness of said anode catalyst layer (Ya) is smaller than average thickness of said cathode catalyst layer (Yc).

2. The membrane-electrode assembly for a fuel cell according to claim 1, wherein said Ya and said Yc satisfy the relation of Ya/Yc=0.01 to 0.9.

3. The membrane-electrode assembly for a fuel cell according to claim 1, wherein said Ya is 0.3 to 10 μm and said Yc is 7 to 20 μm.

4. The membrane-electrode assembly for a fuel cell according to claim 1, wherein said conductive carbon material of the cathode catalyst layer comprises graphitized carbon black.

5. The membrane-electrode assembly for a fuel cell according to claim 4, wherein said graphitized carbon black has a true density of 1.80 to 2.11 g/cm$^3$, a lattice spacing, d$_{002}$, of 3.36 to 3.55 Å and an electric conductivity of 50 to 1000 S/cm.

6. The membrane-electrode assembly for a fuel cell according to claim 4, wherein said graphitized carbon black comprises graphitized carbon black (A) having a BET surface area of not smaller than 100 m$^2$/g.

7. The membrane-electrode assembly for a fuel cell according to claim 6, wherein the BET surface area of said carbon black (A) is 100 to 300 m$^2$/g.

8. The membrane-electrode assembly for a fuel cell according to claim 6, wherein the BET surface area of said carbon black (A) is 120 to 250 m$^2$/g and more.

9. The membrane-electrode assembly for a fuel cell according to claim 6, wherein said cathode catalyst is supported on said carbon black (A) to form a cathode electrode catalyst (C), and the amount of said supported cathode catalyst in said cathode electrode catalyst (C) is 20 to 80% by mass.

10. The membrane-electrode assembly for a fuel cell according to claim 4, wherein said graphitized carbon black further comprises graphitized carbon black (B) having a BET surface area of smaller than 100 m$^2$/g.

11. The membrane-electrode assembly for a fuel cell according to claim 10, wherein the BET surface area of said carbon black (B) is 80 to 100 m$^2$/g.

12. The membrane-electrode assembly for a fuel cell according to claim 10, wherein said cathode catalyst is supported on said carbon black (B) to form a cathode electrode catalyst (D), and the amount of said supported cathode catalyst in said cathode electrode catalyst (D) is 10 to 50% by mass.

13. The membrane-electrode assembly for a fuel cell according to claim 4, wherein said cathode catalyst layer comprises a cathode electrode catalyst (C) having said cathode catalyst supported on graphitized carbon black (A) having a BET surface area of not smaller than 100 m$^2$/g and a cathode electrode catalyst (D) having said cathode catalyst supported on graphitized carbon black (B) having a BET surface area of smaller than 100 m$^2$/g, and mixing ratio of said cathode electrode catalyst (C) and said cathode electrode catalyst (D) is not smaller than 60/40 in mass ratio ((C)/(D)).

14. The membrane-electrode assembly for a fuel cell according to claim 13, wherein mixing ratio of said cathode electrode catalyst (C) and said cathode electrode catalyst (D) is 60/40 to 99/1 in mass ratio ((C)/(D)).

15. The membrane-electrode assembly for a fuel cell according to claim 13, wherein ratio of mixing ratio (R$_{up}$) between said cathode electrode catalyst (C) and said cathode electrode catalyst (D) at the upstream side of the gas flow channel of said cathode catalyst layer, and mixing ratio (R$_{down}$) between said cathode electrode catalyst (C) and said cathode electrode catalyst (D) at the downstream side of the gas flow channel of said cathode catalyst layer is not smaller than 1/1.

16. The membrane-electrode assembly for a fuel cell according to claim 1, wherein said conductive carbon material of the cathode catalyst layer further comprises hydrophobicity-treated carbon black to be hydrophobized using a fluorine compound in an amount of 1 to 20% by mass based on total mass of the conductive carbon material of said cathode catalyst layer.

17. The membrane-electrode assembly for a fuel cell according to claim 1, wherein said conductive carbon material of the cathode catalyst layer further comprises a carbon nanotube, a carbon nanofiber or a carbon nanohorn in an amount of 1 to 20% by mass based on total mass of the conductive carbon material of said cathode catalyst layer.

18. The membrane-electrode assembly for a fuel cell according to claim 1, wherein said platinum alloy is an alloy between at least one base metal selected among chromium, manganese, iron, cobalt and nickel, and platinum.

19. The membrane-electrode assembly for a fuel cell according to claim 18, wherein mixing ratio of said platinum and said base metal in said platinum alloy is 1/1 to 5/1 in mass ratio (platinum/base metal).

20. The membrane-electrode assembly for a fuel cell according to claim 1, wherein said conductive carbon material of the anode catalyst layer comprises carbon black.

21. The membrane-electrode assembly for a fuel cell according to claim 20, wherein said conductive carbon material of the anode catalyst layer comprises graphitized carbon black.

22. The membrane-electrode assembly for a fuel cell according to claim 1, wherein said anode catalyst is supported on said conductive carbon material to form an anode electrode catalyst, and the amount of said supported anode catalyst in said anode electrode catalyst is 30 to 70% by mass.

23. The membrane-electrode assembly for a fuel cell according to claim 1, wherein a gas diffusion layer with a thickness of not thicker than 200 μm, composed of a water-repellent treated carbon paper, is arranged at the outsides of said cathode catalyst layer and said anode catalyst layer.

24. The membrane-electrode assembly for a fuel cell according to claim 23, wherein a mil layer is arranged between said gas diffusion layer, and said cathode catalyst layer and said anode catalyst layer.

25. A proton-exchange membrane fuel cell using the membrane-electrode assembly for a fuel cell set forth in claim 1.

26. A vehicle mounted with the proton-exchange membrane fuel cell set forth in claim 25.

* * * * *